United States Patent
Shen et al.

(10) Patent No.: US 9,242,314 B2
(45) Date of Patent: Jan. 26, 2016

(54) MACHINING METHOD OF WELDING EAR PLATE ON BARREL OF CENTRAL CYLINDER OF HORIZONTAL PREHEATER

(76) Inventors: Jianxin Shen, Shanghai (CN); Chao Hou, Shanghai (CN); Zhong Wang, Shanghai (CN); Shilai Chen, Shanghai (CN)

(*) Notice: Subject to any disclaimer, the term of this patent is extended or adjusted under 35 U.S.C. 154(b) by 478 days.

(21) Appl. No.: 13/808,114

(22) PCT Filed: Feb. 16, 2012

(86) PCT No.: PCT/CN2012/071208
§ 371 (c)(1),
(2), (4) Date: Jan. 3, 2013

(87) PCT Pub. No.: WO2013/063882
PCT Pub. Date: May 10, 2013

(65) Prior Publication Data
US 2014/0203002 A1     Jul. 24, 2014

(30) Foreign Application Priority Data

Nov. 1, 2011   (CN) .......................... 2011 1 0339636

(51) Int. Cl.
| | | |
|---|---|---|
| B23K 31/02 | (2006.01) | |
| B23K 37/047 | (2006.01) | |
| B23K 37/04 | (2006.01) | |
| B23K 31/12 | (2006.01) | |
| B23K 9/007 | (2006.01) | |

(52) U.S. Cl.
CPC ............... *B23K 37/047* (2013.01); *B23K 9/007* (2013.01); *B23K 31/02* (2013.01); *B23K 31/125* (2013.01); *B23K 37/0435* (2013.01); *B23K 2201/12* (2013.01); *B23K 2201/14* (2013.01)

(58) Field of Classification Search
None
See application file for complete search history.

(56) References Cited

U.S. PATENT DOCUMENTS

| 2,160,082 | A | * | 5/1939 | Nicolson | .................... 228/234.1 |
|---|---|---|---|---|---|
| 3,030,698 | A | * | 4/1962 | Pissarevsky | ................. 29/896.3 |
| 4,298,155 | A | * | 11/1981 | Palovcik | ....................... 228/114 |
| 5,004,045 | A | * | 4/1991 | Le Gauyer | .................... 165/149 |
| 5,074,457 | A | * | 12/1991 | Matsuki et al. | ............... 228/158 |
| 5,706,863 | A | * | 1/1998 | Matherne et al. | ............. 138/103 |
| 2011/0206505 | A1 | * | 8/2011 | Mohr | ......................... 415/213.1 |
| 2014/0241814 | A1 | * | 8/2014 | Khachaturian et al. | ........ 405/197 |

* cited by examiner

*Primary Examiner* — Kiley Stoner
(74) *Attorney, Agent, or Firm* — Houtteman Law LLC

(57) ABSTRACT

The invention discloses a machining method of welding an ear plate on a barrel of a central cylinder of a horizontal preheater. The machining method comprises step 1, designing a set of process equipment comprising welding guide brackets, a roller carrier and iron piers; step 2, drawing an assembly line of the ear plate on the barrel of the central cylinder; step 3, drawing a position line of the ear plate on a working platform and placing the ear plate on the central cylinder for spot welding; step 4, installing the welding guide brackets on the central cylinder, hoisting the welding guide brackets and the central cylinder together to the roller carrier, and placing the roller carrier on the iron piers to allow both ends of the central cylinder to be basically coaxial; step 5, placing temporary fixed flat steel on both ends of the ear plate and placing a run on plate and a blowout plate; step 6, symmetrically welding both sides of the ear plate on the central cylinder; step 7, removing the temporary fixed flat steel, the run on plate and the blowout plate, batch grinding welds and burrs; and step 8, hoisting the roller carrier and removing the welding guide brackets after the welds are proved conforming by ultrasonic examination. The horizontally welding method of the invention can substantially improve welding quality and reduce labor intensity of operators.

6 Claims, 4 Drawing Sheets

MACHINING METHOD OF WELDING EAR PLATE ON BARREL OF CENTRAL CYLINDER OF HORIZONTAL PREHEATER

FIELD OF THE INVENTION

The invention relates to a machining method of welding ear plates, in particular to a machining method capable of horizontally welding circumferentially dispersed finlike ear plates to a cylinder face of a central cylinder of a horizontal preheater. The invention is applicable to manufacture of central cylinders of horizontally-mounted rotary air preheaters and belongs to technical field of the rotary heat exchanger equipment.

DESCRIPTION OF THE RELATED ART

A central cylinder 10 is a core component of a horizontal preheater. The installation relation of the central cylinder of the horizontal preheater is shown in FIG. 1. The central cylinder 10 is provided with guide end axles 11 at both ends and supported on intermediate beams 12 respectively at left and right with the help of the guide end axles 11; a radial baffle 131 in module components 13 (i.e. grids in FIG. 1) and an ear plate 20 welded to a cylinder face of the central cylinder are connected by a locating plate on the site (the locating plate is not shown in the figure and has been removed after the modular component is properly installed) and welded together; and all heat transfer components are placed and welded firmly in modules (i.e. corrugated plates are packed into packets as per shape and dimension of the grids shown in FIG. 1). Therefore, key process of manufacturing this equipment is to ensure the quality of welding a circumferential finlike ear plate to the barrel of the central cylinder; for the position bears weight of all the heat transfer components, and poor welding quality may cause weld crack due to shear force during operation of the preheater and affect operation of the preheater.

A common method in the prior art is to vertically weld the barrel of the central cylinder to the ear plate, and the central cylinder can be only placed on a platform and welded to the ear plate as shown in FIGS. 2a and 2b if no measure is taken. The barrel of the central cylinder 10 consists of a first component 101, a second component 102 and a third component 103, the ear plate 20 is welded to the barrel of the central cylinder 10 consisting of the three components, and the locating plate 40 is spot welded to the ear plate 20. Due to such factors affecting welding quality as poor penetration, easy welding slag hanging and poor weld forming when the barrel of the central cylinder is vertically welded to the ear plate, the best choice for this procedure is horizontal welding. However, the horizontal welding can be completed only after process equipment is manufactured to raise the horizontal central cylinder high into the air and rotate the central cylinder.

SUMMARY OF THE INVENTION

The purpose of the invention is to manufacture a set of process equipment capable of raising the horizontal central cylinder high into the air and rotating the central cylinder so that flat welding method (i.e. horizontal welding) can be used when the barrel of the central cylinder is welded to the ear plate. The machining method can improve quality of welding the central cylinder to the ear plate substantially.

In order to achieve the purpose, the invention provides a machining method of welding an ear plate on a barrel of a central cylinder of a horizontal preheater. The machining method comprises the following specific steps:

step 1, designing and preparing a set of process equipment comprising a pair of welding guide brackets, a roller carrier with a pair of rollers and a pair of iron piers, and capable of hoisting the central cylinder of the horizontal preheater to the roller carrier for welding after the process equipment supports the central cylinder of the horizontal preheater with the help of the welding guide bracket;

step 2, placing the central cylinder on a boring lathe, circumferentially dividing the central cylinder into 24 equal parts and drawing an assembly line of the ear plate on the barrel;

step 3, hoisting the central cylinder to a working platform of a workshop, drawing a position line of the ear plate on the platform and placing the ear plate on the central cylinder for spot welding;

step 4, installing the welding guide brackets on the central cylinder, then hoisting the welding guide brackets and the central cylinder together to the roller carrier, placing the roller carrier on the iron piers, and adjusting space between two rollers of the roller carrier to allow both ends of the central cylinder to be basically coaxial;

step 5, placing temporary fixed flat steel on both ends of the ear plate and placing a run on plate and a blowout plate on both ends of a weld;

step 6, symmetrically welding both sides of the ear plate on the central cylinder to ⅓ weld height, performing back gouging, welding the back to ½ weld height, welding the front to ⅔ weld height, welding the back properly, and finally welding the front properly;

step 7, removing the temporary fixed flat steel, the run on plate and the blowout plate, batch grinding welds and burrs, and clearing splashes; and step 8, hoisting the roller carrier and removing the welding guide brackets after the welds are proved conforming by ultrasonic examination.

In the machining method of welding an ear plate on a barrel of a central cylinder of a horizontal preheater, step 3 also comprises a weld preheating step for spot welding.

In the machining method of welding an ear plate on a barrel of a central cylinder of a horizontal preheater, step 3 also comprises using a sample plate to correct position of the ear plate for equal distribution after the spot welding and reinforcing the spot welding after meeting drawing requirements.

In the machining method of welding an ear plate on a barrel of a central cylinder of a horizontal preheater, the step of reinforcing the spot welding also comprises a weld preheating step.

In the machining method of welding an ear plate on a barrel of a central cylinder of a horizontal preheater, deformation prevention measure is taken during welding in step 6.

In the machining method of welding an ear plate on a barrel of a central cylinder of a horizontal preheater, the deformation prevention measure means that two welders simultaneously weld an ear plate and symmetrically weld both ends of the ear plate.

The invention has the advantages that a workpiece are placed as per natural position and status while enabling the workpiece to rotate stably; the process equipment designed and manufactured has simple structure and is hoisted safely and conveniently; during welding, welding quality is improved and operators can stand up for welding, which will relieve their bodies from any discomfort and reduce labor intensity.

BRIEF DESCRIPTION OF THE DRAWINGS

FIGS. 2b and 2a are circumferential cross section.

DETAILED DESCRIPTION OF THE PREFERRED EMBODIMENT

Figure 1:
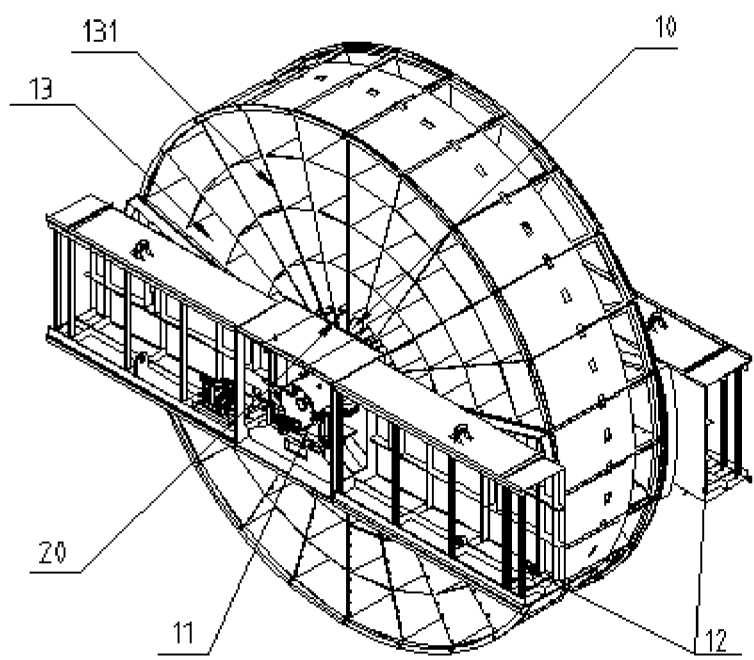
FIG. 1 is a structural diagram of installation relation of a central cylinder of a horizontal preheater.
Figure 2A:
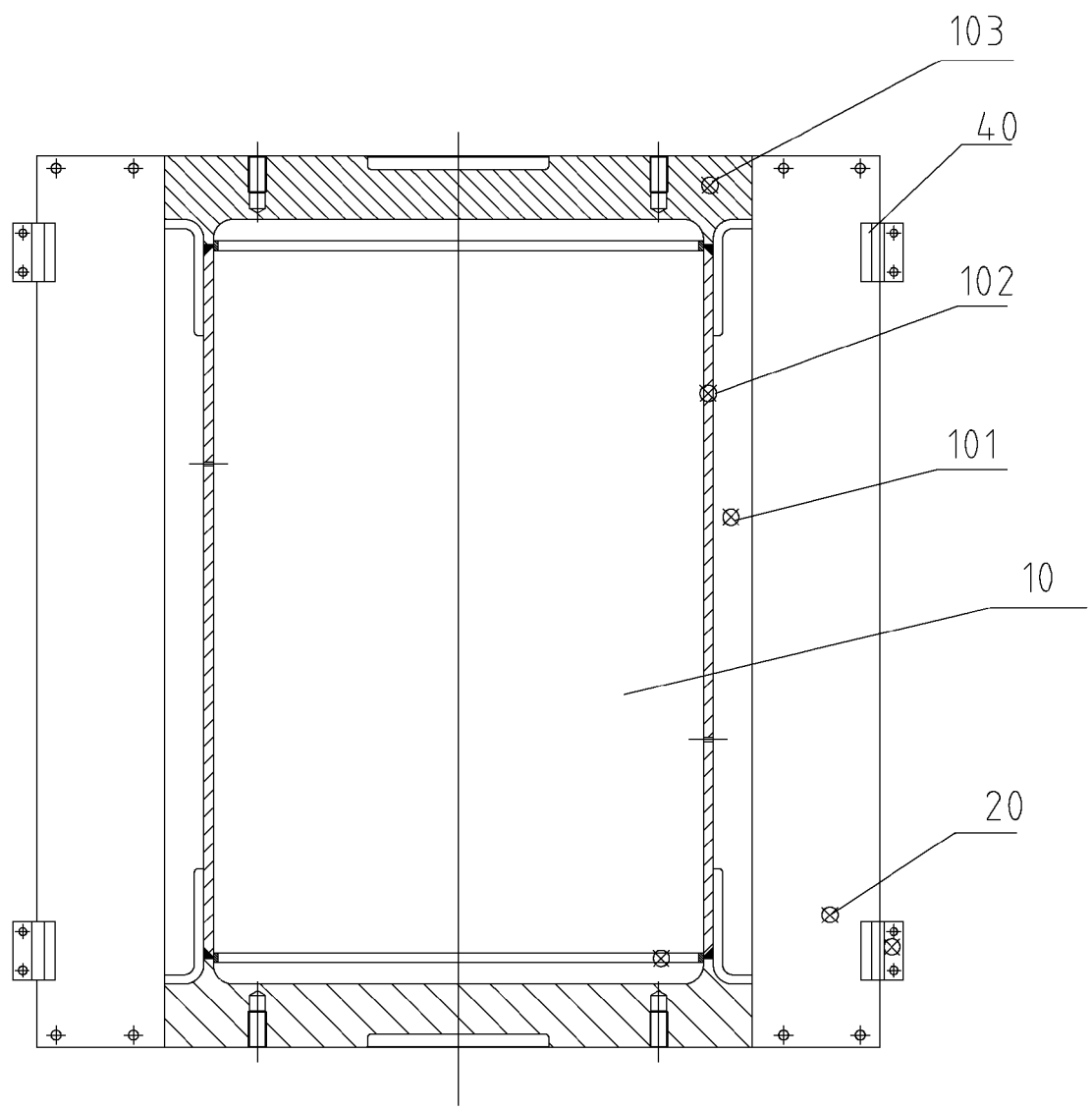
FIG. 2a is a schematic diagram that the central cylinder can only be placed on a platform and welded to an ear plate when no measure is taken.
Figure 2B:
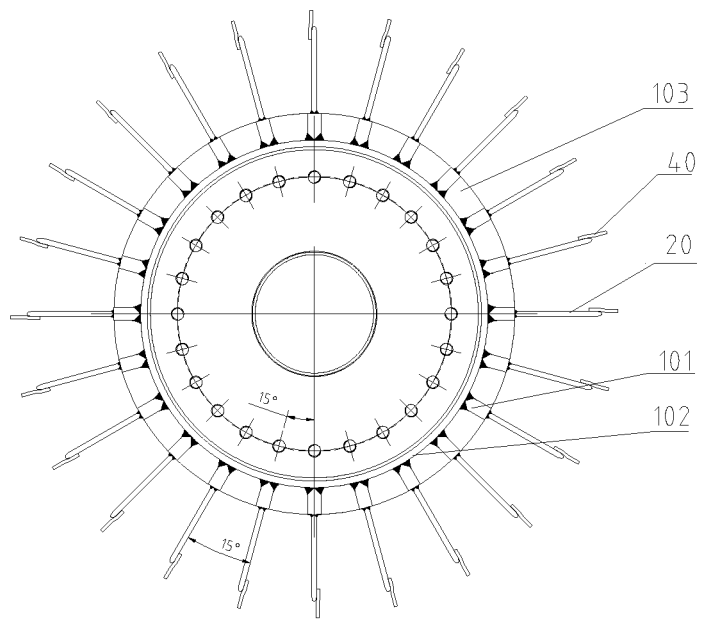

The invention will be described in detail in combination with accompanied drawings and embodiment.

Figure 3:
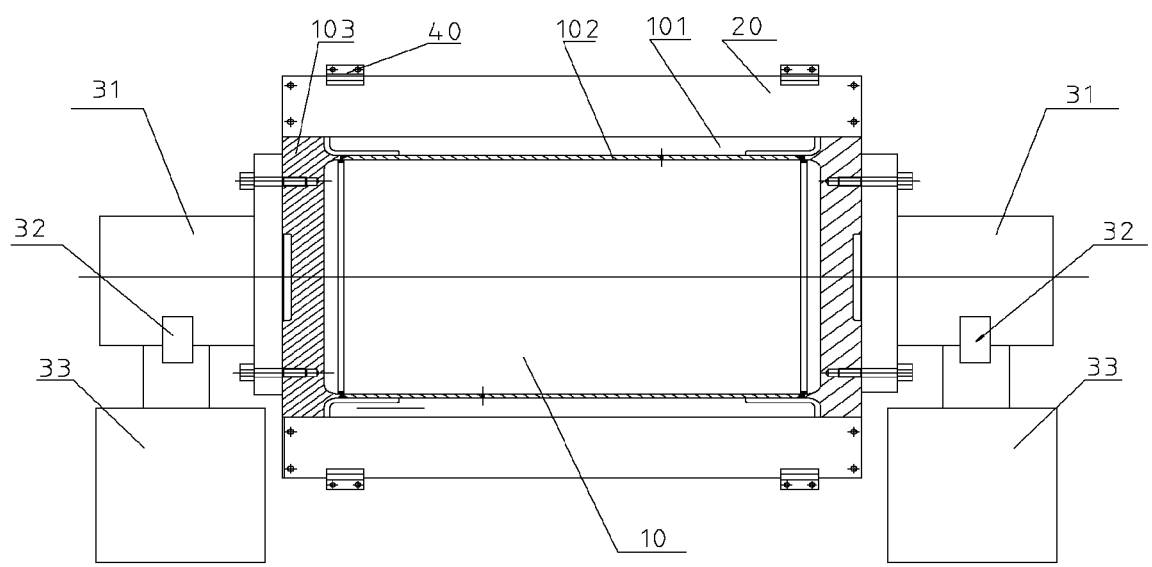
FIG. 3 shows a method actually used when the central cylinder of the invention is provided with welding guide brackets and placed on a roller carrier, i.e. a schematic diagram of horizontally welding the ear plate.

Embodiment step 1, designing and preparing a set of process equipment comprising a pair of welding guide brackets 31, a roller carrier 32 with a pair of rollers and a pair of iron piers 33, and capable of hoisting a central cylinder 10 of a horizontal preheater to the roller carrier for welding after the process equipment supports the central cylinder 10 of the horizontal preheater with the help of the welding guide brackets 31;

step 2, placing the central cylinder 10 on a boring lathe, circumferentially dividing the central cylinder into 24 equal parts and drawing an assembly line of the ear plate 20 on a barrel;

step 3, hoisting the central cylinder 10 to a working platform of a workshop, drawing a position line of the ear plate 20 on the platform, placing the ear plate 20 on the central cylinder 10 for spot welding (weld preheating), correcting position of the ear plate with a sample plate for equal distribution and reinforcing spot welding after meeting drawing requirements (weld preheating);

step 4, installing the welding guide brackets 31 on the central cylinder 10 with tools such as bolts, then hoisting the central cylinder and the welding guide brackets together to the roller carrier 32, placing the roller carrier 32 on the iron piers 33, and adjusting space between two rollers of the roller carrier 32 to allow both ends of the central cylinder 10 to be basically coaxial, as shown in FIG. 3;

step 5, placing temporary fixed flat steel on both ends of the ear plate 20 and placing a run on plate and a blowout plate on both ends of a weld;

step 6, symmetrically welding both sides of the ear plate 20 on the central cylinder to ⅓ weld height, performing back gouging, welding the back to ½ weld height, welding the front to ⅔ weld height, welding the back properly, finally welding the front properly, and taking deformation prevention measure during welding which means that two welders simultaneously weld an ear plate and symmetrically weld both ends of the ear plate;

step 7, removing the temporary fixed flat steel, the run on plate and the blowout plate, batch grinding welds and burrs, and clearing splashes; and step 8, hoisting the roller carrier 32 and removing the welding guide brackets 31 after the welds are proved conforming by ultrasonic examination.

The invention designs and manufactures a set of process equipment of welding guide brackets capable of supporting and hoisting the central cylinder to the roller carrier for welding. The horizontal welding process method with the process equipment can substantially improve quality of welding the central cylinder to the ear plate, and also reduce labor intensity of operators.

While the invention has been described in detail and with reference to preferred embodiments, it is to be understood that the invention is not restricted thereto. It will be apparent to those skilled in the art that various changes and modifications can be made therein in accordance with the disclosure. Therefore, scope of the invention is to be restricted only by the appended claims.

The invention claimed is:

1. A machining method of welding an ear plate on a barrel of a central cylinder of a horizontal preheater, characterized by comprising the following specific steps:
    step 1, preparing a set of process equipment comprising a pair of welding guide brackets (31), a roller carrier (32) with a pair of rollers and a pair of iron piers (33);
    step 2, placing the central cylinder (10) of the horizontal preheater on a boring lathe, circumferentially dividing the central cylinder into 24 equal parts and drawing an assembly line of the ear plate (20) on the barrel;
    step 3, hoisting the central cylinder (10) to a working platform of a workshop, drawing a position line of the ear plate (20) on the platform and placing the ear plate (20) on the central cylinder (10) for spot welding;
    step 4, installing a pair of welding guide brackets (31) on both ends of the central cylinder (10) respectively, then hoisting the welding guide brackets and the central cylinder together to the roller carrier (32), placing the roller carrier (32) on the iron piers (33), and adjusting space between two rollers of the roller carrier to allow both ends of the central cylinder to be substantially coaxial;
    step 5, placing temporary fixed flat steel on both ends of the ear plate (20) and placing a run on plate and a blowout plate on both ends of a weld;
    step 6, symmetrically welding both sides of the ear plate on the central cylinder to ⅓ weld height, performing back gouging, welding a back of the ear plate to ½ weld height, welding a front of the ear plate to ⅔ weld height, welding the back of the ear plate completely, and finally welding the front of the ear plate completely;
    step 7, removing the temporary fixed flat steel, the run on plate and the blowout plate, batch grinding welds and burrs, and clearing splashes; and
    step 8, hoisting the roller carrier (32) and removing the welding guide brackets (31) after the welds are proved conforming by ultrasonic examination.

2. The machining method of welding an ear plate on a barrel of a central cylinder of a horizontal preheater according to claim 1, characterized in that step 3 also comprises a weld preheating step for spot welding.

3. A machining method of welding an ear plate on a barrel of a central cylinder of a horizontal preheater according to claim 1, characterized in that step 3 also comprises using a sample plate to correct position of the ear plate for equal distribution after the spot welding and reinforcing the spot welding after meeting drawing requirements.

4. A machining method of welding an ear plate on a barrel of a central cylinder of a horizontal preheater according to claim 3, characterized in that the step of reinforcing the spot welding also comprises a weld preheating step.

5. A machining method of welding an ear plate on a barrel of a central cylinder of a horizontal preheater according to claim 1, characterized in that deformation prevention measure is taken during welding in step 6.

6. A machining method of welding an ear plate on a barrel of a central cylinder of a horizontal preheater according to claim 5, characterized in that the deformation prevention measure means that two welders simultaneously weld an ear plate and symmetrically weld both ends of the ear plate.

\* \* \* \* \*